US012617385B2

(12) United States Patent
Zeutzius

(10) Patent No.: US 12,617,385 B2
(45) Date of Patent: May 5, 2026

(54) PREDICTION APPARATUS AND PREDICTION METHOD FOR AT LEAST ONE BRAKE SYSTEM COMPONENT OF A BRAKE SYSTEM OF A VEHICLE

(71) Applicant: Robert Bosch GmbH, Stuttgart (DE)

(72) Inventor: Michael Zeutzius, Tamm (DE)

(73) Assignee: ROBERT BOSCH GMBH, Stuttgart (DE)

( * ) Notice: Subject to any disclaimer, the term of this patent is extended or adjusted under 35 U.S.C. 154(b) by 122 days.

(21) Appl. No.: 18/548,120

(22) PCT Filed: May 12, 2022

(86) PCT No.: PCT/EP2022/062942
§ 371 (c)(1),
(2) Date: Aug. 28, 2023

(87) PCT Pub. No.: WO2022/243166
PCT Pub. Date: Nov. 24, 2022

(65) Prior Publication Data
US 2024/0300467 A1 Sep. 12, 2024

(30) Foreign Application Priority Data
May 19, 2021 (DE) ..................... 10 2021 205 088.3

(51) Int. Cl.
B60T 17/22 (2006.01)
(52) U.S. Cl.
CPC ........... B60T 17/22 (2013.01); B60T 2210/12 (2013.01); B60T 2220/04 (2013.01)
(58) Field of Classification Search
CPC ........ B60T 8/885; B60T 13/686; B60T 17/22; B60T 17/221; B60T 2201/03;
(Continued)

(56) References Cited

U.S. PATENT DOCUMENTS

| | | | | |
|---|---|---|---|---|
| 2008/0093919 A1* | 4/2008 | Klug | ....................... | B60T 8/442 303/11 |
| 2013/0173130 A1* | 7/2013 | Vollert | .................... | B60T 7/042 701/70 |

(Continued)

FOREIGN PATENT DOCUMENTS

| | | | | | |
|---|---|---|---|---|---|
| CN | 115270463 A | * | 11/2022 | ............. | G06F 30/20 |
| CN | 116691633 A | * | 9/2023 | ............. | B60T 13/74 |

(Continued)

OTHER PUBLICATIONS

Avinash, et al., "Investigation of pedestrian collision avoidance with auto brake," 2017 Recent Developments in Control, Automation & Power Engineering (RDCAPE), Noida, India, 2017, pp. 477-481, doi: 10.1109/RDCAPE.2017.8358318. (https://ieeexplore.ieee.org/document/8358318) (Year: 2017).*

(Continued)

*Primary Examiner* — Atul Trivedi
(74) *Attorney, Agent, or Firm* — NORTON ROSE FULBRIGHT US LLP

(57) ABSTRACT

A prediction device for at least one brake system component of a brake system of a vehicle. The prediction device is configured for provided value groups which each have values and/or information ascertained during a plurality of driving dynamics regulating processes executed during driver-induced and/or autonomous braking processes of the vehicle and each include an ascertained input variable, a simultaneously ascertained output variable, and an item of friction value or position indication information relating to a roadway simultaneously traveled on by the vehicle, to enter the value groups into a coordinate system having a plurality of target sectors which each correspond to a specified target relation between the input variable and the output variable at a specific friction value, and to estimate whether an occurrence of a functional impairment of a brake system (Continued)

component of the brake system is probable at least during a specified prediction time interval.

10 Claims, 5 Drawing Sheets

(58) Field of Classification Search
CPC ............. B60T 2210/12; B60T 2220/04; B60T 2240/36; B60T 2260/32; B60T 2270/406; B60T 2270/413; B60L 3/0076; B60L 7/10; B60L 7/18; B60W 50/0097; B60W 50/0205; B60W 50/023; B60W 50/029
USPC ........................................................ 701/31.9
See application file for complete search history.

(56) References Cited

U.S. PATENT DOCUMENTS

| | | | | |
|---|---|---|---|---|
| 2018/0251106 A1* | 9/2018 | Kasteel | ................... | B60T 8/176 |
| 2018/0354477 A1* | 12/2018 | Koch | ................. | B60T 8/17557 |
| 2019/0016324 A1* | 1/2019 | Wagner | ................... | B60T 17/16 |
| 2020/0079381 A1* | 3/2020 | Lombrozo | ........ | B60W 60/0015 |
| 2020/0114889 A1* | 4/2020 | Egnor | ........................ | B60T 11/20 |
| 2020/0156607 A1* | 5/2020 | Ueno | ................... | B60W 30/02 |
| 2020/0180605 A1* | 6/2020 | Boecker | ............... | B60W 10/20 |
| 2020/0189556 A1* | 6/2020 | Burt | ........................ | B60T 17/22 |
| 2020/0262403 A1* | 8/2020 | Kuras | ....................... | B60T 8/58 |
| 2021/0046971 A1* | 2/2021 | Bae | ......................... | B60L 50/61 |
| 2021/0061243 A1* | 3/2021 | Eisele | .................... | B60T 8/172 |
| 2021/0086623 A1* | 3/2021 | Yao | ................. | B60W 30/18172 |
| 2021/0086736 A1* | 3/2021 | Yao | ........................... | B60T 1/10 |
| 2021/0122348 A1* | 4/2021 | Leiber | .................... | B60T 13/66 |
| 2021/0162966 A1* | 6/2021 | Passmann | .............. | B60T 8/171 |
| 2022/0055592 A1* | 2/2022 | Leiber | .................... | B60T 7/042 |
| 2022/0097707 A1* | 3/2022 | Semenov | ............. | B60T 8/3215 |
| 2023/0150371 A1* | 5/2023 | Hingst | ................... | B60T 8/172 |
| | | | | 701/22 |
| 2023/0192044 A1* | 6/2023 | Marx | ................. | B60T 8/17551 |
| | | | | 701/70 |
| 2023/0227012 A1* | 7/2023 | Kim | ...................... | B60T 13/662 |
| | | | | 701/70 |
| 2023/0406279 A1* | 12/2023 | Kim | ......................... | B60T 8/28 |
| 2024/0017702 A1* | 1/2024 | Jing | ......................... | B60T 8/172 |
| 2024/0075912 A1* | 3/2024 | Kim | ................... | B60T 8/17636 |
| 2024/0123953 A1* | 4/2024 | Diamond | ............ | B60W 30/085 |
| 2024/0326761 A1* | 10/2024 | Putz | ........................ | B60T 8/172 |
| 2025/0136072 A1* | 5/2025 | Kodani | .............. | B60T 8/17616 |

FOREIGN PATENT DOCUMENTS

| | | | | | |
|---|---|---|---|---|---|
| CN | 118317898 | A | * | 7/2024 | |
| CN | 118358548 | A | * | 7/2024 | .............. B60T 13/12 |
| DE | 4446592 | A1 | | 6/1996 | |
| DE | 19855332 | A1 | | 6/2000 | |
| DE | 102011111592 | A1 | | 2/2013 | |
| DE | 102014003635 | B3 | | 7/2015 | |
| DE | 102015112232 | A1 | | 2/2017 | |
| DE | 102016202575 | A1 | | 8/2017 | |
| DE | 102017101510 | A1 | | 8/2017 | |
| DE | 102017218446 | A1 | | 5/2018 | |
| DE | 102012200494 | B4 | * | 7/2020 | .............. B60T 8/326 |
| DE | 102019208811 | A1 | | 12/2020 | |
| DE | 202019107193 | U1 | * | 12/2020 | .......... B60L 15/2009 |
| DE | 102019123343 | A1 | * | 3/2021 | ............. B60T 8/4081 |
| DE | 102007030803 | B4 | * | 9/2021 | ................ B60T 7/22 |
| DE | 102020206289 | A1 | * | 11/2021 | ........... B60T 13/662 |
| DE | 102022112621 | B3 | * | 10/2023 | ............. B60T 8/172 |
| DE | 102023100999 | A1 | * | 3/2024 | ........... B60T 13/741 |
| EP | 3747716 | A1 | * | 12/2020 | ........... B60T 15/027 |
| EP | 4072912 | B1 | * | 3/2024 | ............. B60T 8/329 |
| ES | 2773312 | T3 | * | 7/2020 | ........... B60T 8/1706 |
| ES | 2961536 | T3 | * | 3/2024 | ........... B60T 8/3205 |
| IT | 102018000009632 | B1 | * | 10/2020 | |
| IT | 202100030635 | A1 | * | 6/2023 | ............. B60T 8/172 |
| JP | 2020093584 | A | * | 6/2020 | ............. B60T 8/245 |
| JP | 2022155511 | A | * | 10/2022 | ......... B60W 10/196 |
| JP | 2023009608 | A | * | 1/2023 | |
| KR | 20230125252 | A | * | 8/2023 | ............. F16D 65/18 |
| VN | 10039945 | B | * | 5/2024 | |
| WO | WO-2020104066 | A1 | * | 5/2020 | ........... B60T 17/221 |
| WO | WO-2020104067 | A1 | * | 5/2020 | ........... B60T 17/221 |
| WO | WO-2020104069 | A1 | * | 5/2020 | ............. G01L 5/286 |
| WO | WO-2021059915 | A1 | * | 4/2021 | ................ B60T 7/12 |
| WO | WO-2022011223 | A2 | * | 1/2022 | ......... B60G 17/0165 |
| WO | WO-2022243166 | A1 | * | 11/2022 | ........ B60W 50/0205 |
| WO | WO-2022243168 | A1 | * | 11/2022 | ........... B60T 17/221 |
| WO | WO-2022243170 | A1 | * | 11/2022 | ........... B60W 50/04 |
| WO | WO-2023283667 | A1 | * | 1/2023 | ........... B60T 13/586 |
| WO | WO-2023041325 | A1 | * | 3/2023 | ........... B60T 17/221 |
| WO | WO-2024012900 | A1 | * | 1/2024 | ................ B60T 8/94 |

OTHER PUBLICATIONS

International Search Report for PCT/EP2022/062942, Issued Oct. 26, 2022.

* cited by examiner

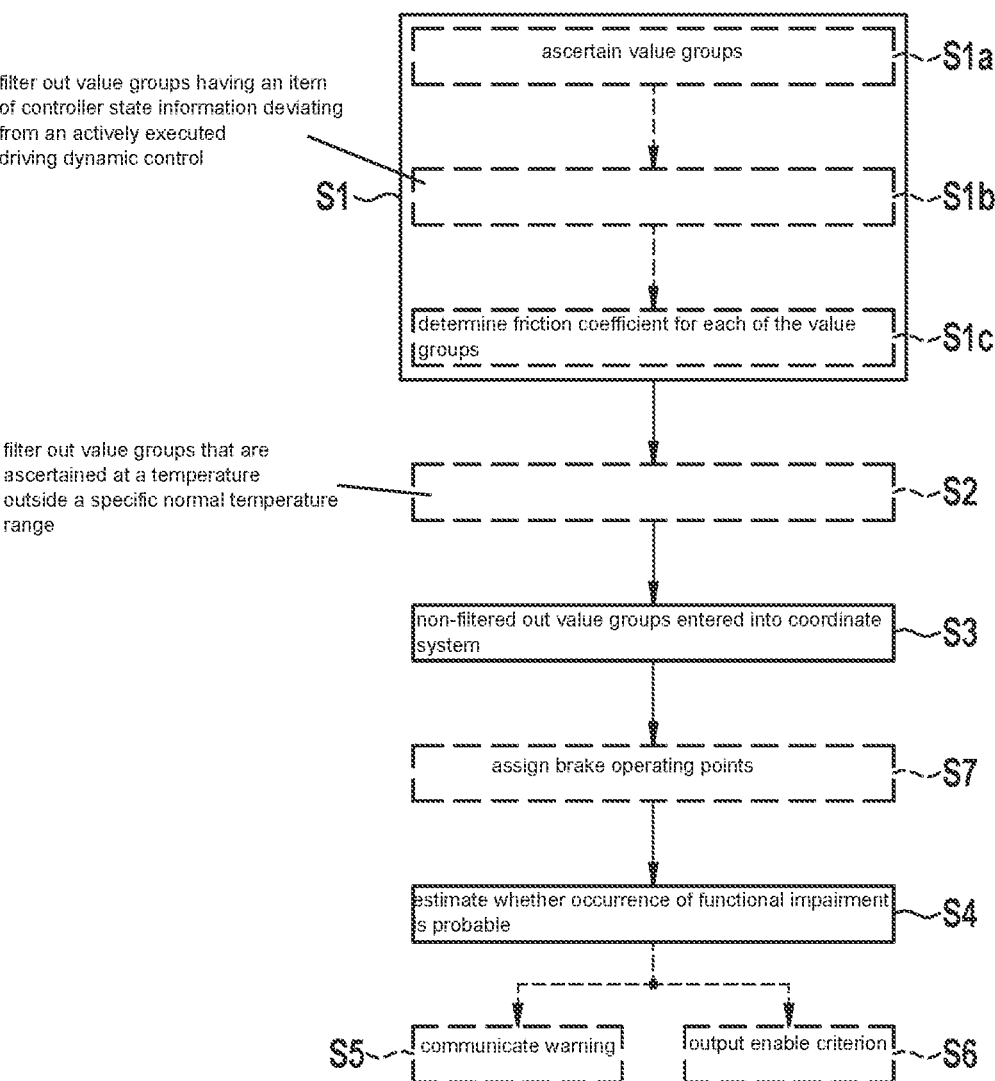

filter out value groups having an item of controller state information deviating from an actively executed driving dynamic control

S1

S1a ascertain value groups

S1b

S1c determine friction coefficient for each of the value groups filter out value groups that are ascertained at a temperature outside a specific normal temperature range

S2

S3 non-filtered out value groups entered into coordinate system

S7 assign brake operating points

S4 estimate whether occurrence of functional impairment is probable

S5 communicate warning

S6 output enable criterion

Fig. 1A

PREDICTION APPARATUS AND PREDICTION METHOD FOR AT LEAST ONE BRAKE SYSTEM COMPONENT OF A BRAKE SYSTEM OF A VEHICLE

FIELD

The present invention relates to a prediction device for at least one brake system component of a brake system of a vehicle. Similarly, the present invention relates to a prediction method for at least one brake system component of a brake system of a vehicle.

BACKGROUND INFORMATION

Methods for monitoring a motor vehicle are described in the related art. For example, German Patent Application No. DE 10 2017 218 446 A1 describes a method for monitoring a motor vehicle with an automated driving function, in which in particular an energy storage device, which supplies at least one consumer designed to bring the motor vehicle to a standstill, is monitored.

SUMMARY

The present invention provides a prediction device for at least one brake system component of a brake system of a vehicle, and a prediction method for at least one brake system component of a brake system of a vehicle.

The present invention provides advantageous means not only for monitoring, but also for early diagnosis of at least one brake system component of a brake system of a vehicle. Thus, the present invention not only enables a recognition of a failure that has already occurred of at least the one brake system component of the respective brake system, but also enables a prediction regarding future functional capacity and future operating behavior of at least the one brake system component of the brake system. As will be explained in more detail below, for a large number of different brake system components, such as for example for an electromechanical brake booster upstream of a master brake cylinder of the respective brake system and/or for a motorized plunger device integrated into the respective brake system (such as, specifically, an IPB, Integrated Power Brake), their future functional capacity can be reliably predicted using the present invention. Since by using the present invention a future functional impairment or a future failure of at least the one brake system component of the respective brake system can be predicted earlier, it is also advantageously suitable for safeguarding an autonomous driving operation of the vehicle equipped with the respective brake system.

In an advantageous example embodiment of the prediction device of the present invention, for value groups provided to the electronic device which in each case include, in addition to the ascertained input variable and the simultaneously ascertained output variable, a location indication of the roadway simultaneously traveled on by the vehicle as friction value or location indication information, the electronic device is designed and/or programmed to query the respective friction value from a specified friction value map on the basis of the respective location indication and to add the queried friction value to the value group. Since the prediction device can also be understood as a prediction device that can be used separately from the vehicle, the prediction device can easily be equipped with an extensive friction value map from which the respective friction values can be queried.

According to an example embodiment of the present invention, alternatively and additionally, the electronic device can be designed and/or programmed to filter out, from the value groups provided to the electronic device, which in each case have values and/or information ascertained during driver-induced and/or autonomous braking processes of the vehicle and in each case include an item of controller state information in addition to the ascertained input variable, the simultaneously ascertained output variable, and the friction value or location indication information relating to the roadway simultaneously traveled by the vehicle, the value groups having an item of controller state information that deviates from an actively executed vehicle dynamics regulating process. In this way, it can be reliably ensured that only value groups for actively executed vehicle dynamics regulating processes are entered into the coordinate system. Likewise, the technique described here can be used to ensure that value groups for actively executed vehicle dynamics regulating processes are matched with the brake characteristic map of the coordinate system as correct operating states of the brake system and are not interpreted as a malfunction.

As an advantageous further development of the prediction device of the present invention, the electronic device can be designed and/or programmed to assign brake operating points to each of the value groups entered in the coordinate system and to estimate, additionally taking into account the distribution of the brake operating points ascertained for the vehicle dynamics regulating processes, whether an occurrence of at least one functional impairment of at least the one brake system component of the brake system is probable at least during the specified prediction time interval. This can improve the prediction carried out by the embodiment of the prediction device described herein for at least the one brake system component of the brake system.

For example, the prediction device can be capable of being mounted on the vehicle. The vehicle can in this way be equipped with its own prediction device.

Alternatively, the prediction device can include a communication device designed to receive the value groups transmitted by a data transmitting device of the vehicle. In this case, it is not necessary to mount the prediction device on the vehicle. The specific example embodiment of the prediction device of the present invention described here can therefore be readily formed with a comparatively large volume and/or a relatively high weight. In addition, the embodiment of the prediction device described herein may also receive from a plurality of vehicles the value groups transmitted by their data transmitting devices. In this case, the prediction device can be used for monitoring and early diagnosis of at least the one brake system component of the brake systems of the vehicle.

The advantages described above are also ensured when carrying out a corresponding prediction method for at least one brake system component of a brake system of a vehicle.

In an advantageous specific example embodiment of the prediction device of the present invention, brake operating points are assigned to each of the value groups entered in the coordinate system and, additionally taking into account the distribution of the brake operating points ascertained for the vehicle dynamics regulating processes, it is estimated whether an occurrence of at least one functional impairment of at least the one brake system component of the brake system is probable at least during the specified prediction time interval. In this way, the early diagnosis carried out by the prediction method for the at least one brake system component of the respective brake system can be improved.

According to an example embodiment of the present invention, preferably, before the ascertained value groups are entered into the coordinate system, the value groups are filtered out that are ascertained at a temperature outside a specified normal temperature range, at an adjustment speed of the brake pedal adjusted by the driver outside a specified normal speed range, at an on-board electrical system voltage outside a specified normal voltage range, during a failure of a data provision device, and/or during a fading. In this way, extreme temperatures, unusual adjustment speeds of the brake pedal, a functional impairment or failure of a battery of the vehicle, a failure of the data provision device, or a fading can be prevented from causing impairment of the prediction determined by the prediction method described herein. Short-term temporary (plausible) fluctuations in the temperature, of the adjustment speed of the brake pedal, or of the vehicle electrical system voltage can be evaluated as a "use case." Anomalies can be registered and followed up on, and possibly outputted to the driver in the form of a failure prediction and/or item of information. Alternatively, the filtered-out value groups can also be evaluated separately in order in this way to investigate the causes and effects of the respective filter criteria on the brake characteristics.

For example, as the input quantity, a rod travel of an input rod connected to the brake pedal, a master cylinder pressure in a master cylinder of the brake system, a motor current strength of a motor of the motorized brake pressure buildup device, an operating voltage of the motor of the motorized brake pressure buildup device, an adjusting travel of at least one adjustable piston of the motorized brake pressure buildup device, or a pumping rate of at least one pump used as the motorized brake pressure buildup device of the brake system can be ascertained, and/or as the output quantity the master cylinder pressure in the master cylinder, a motor torque of the motor of the motorized brake pressure buildup device, a gear mechanism efficiency of a gear mechanism of the brake system connected to the motorized brake pressure buildup device, at least one brake pressure in at least one wheel brake cylinder of the brake system, a braking force applied to the vehicle by the brake system, a braking torque applied to the vehicle by the brake system, or a vehicle deceleration applied to the vehicle by the brake system are ascertained. The examples of the input variable and the output variable given here can be determined using a conventional sensor system already installed on the vehicle.

Thus, the prediction method described here can be carried out without an extension of the sensor technology conventionally already installed on the vehicle.

BRIEF DESCRIPTION OF THE DRAWINGS

Further features and advantages of the present invention are explained below with reference to the figures.

FIGS. 1A to 1D show a flow diagram and coordinate systems for explaining an example embodiment of the prediction method for at least one brake system component of a brake system of a vehicle, according to the present invention.

DETAILED DESCRIPTION OF EXAMPLE EMBODIMENTS

Figure 1B:
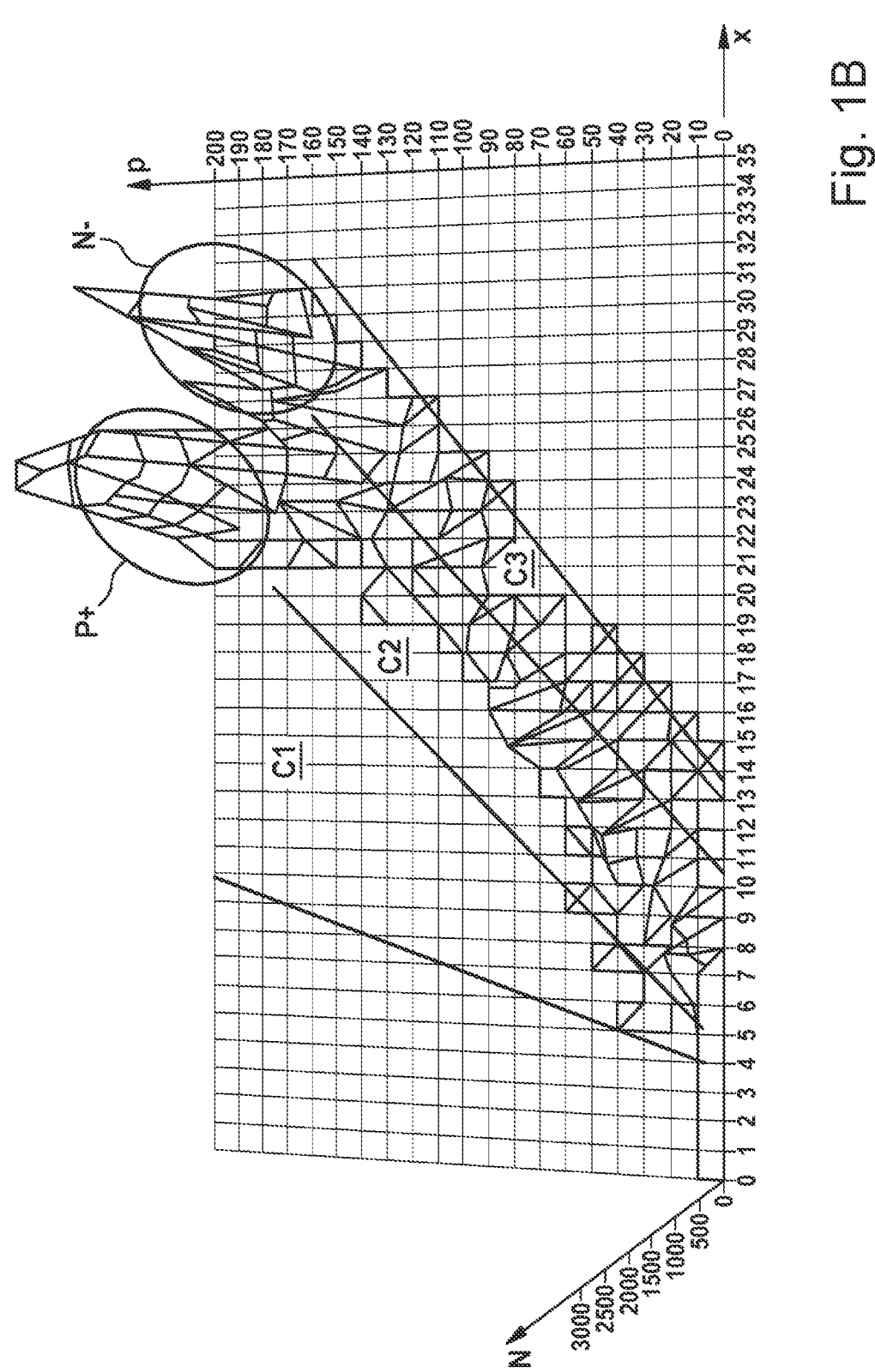

FIGS. 1A to 1D show a flow diagram and coordinate systems for explaining an embodiment of the prediction method for at least one brake system component of a brake system of a vehicle.

The prediction method described below can be carried out for a large number of different types of brake systems. It is expressly noted here that a practicability of the prediction method is also not limited to a specific vehicle type/motor vehicle type of the vehicle/motor vehicle equipped with the respective brake system.

In a method step S1 of the prediction method, value groups and/or information are ascertained during a plurality of vehicle dynamics regulating processes that are actively carried out during driver-induced and/or autonomous braking processes of the vehicle. For this purpose, for each of the ascertained value groups, in each case a ascertained input variable x, an output variable p ascertained simultaneously with the input variable x of the respective value group, and an ascertained or queried friction value u of a roadway traveled by the vehicle at the same time as the ascertaining of the input variable x and the output variable p are determined. Driving dynamics controlling can be understood to mean, for example, ABS controlling (anti-lock brake system control), ESP controlling (electronic stability control), TCS controlling (traction control system) or ACC controlling (adaptive cruise control).

The input variable x denotes a variable representing an actuation strength of an actuation of a brake pedal by a driver of the vehicle or an operation mode of a motorized brake pressure buildup device of the brake system. An input variable reflecting the operating mode of the motorized brake pressure buildup device can also be understood as a variable specified by an automatic system for controlling the autonomous braking processes of the vehicle. In the example of FIGS. 1A through 1D, the input variable x is a rod travel x of an input rod connected to the brake pedal. The rod travel x can be easily and reliably detected using a rod travel sensor, for example. As output variable p, a variable is ascertained which indicates a reaction of the brake system to the input variable x. As an example, in the embodiment described here, a master brake cylinder pressure p in a master brake cylinder of the brake system is ascertained as output variable p. The main brake cylinder pressure p can also be understood as a pre-pressure p of the brake system. For example, a pre-pressure sensor of the brake system can be used to ascertain the master cylinder pressure p. A coefficient of friction of the roadway traveled by the vehicle can for example be understood as friction coefficient μ.

However, the examples given here for the input variable x and the output variable p are not to be interpreted in a limiting manner. For example, the master cylinder pressure p in the master cylinder of the brake system can also be ascertained as input variable, provided that it can (essentially) be assumed that it corresponds to an actuation of the brake pedal by the driver. Alternatively, a motor current strength of a motor of the motorized brake pressure buildup device, an operating voltage of the motor of the motorized brake pressure buildup device, an adjustment travel of at least one adjustable piston of the motorized brake pressure buildup device, such as in particular an adjustment path of the at least one adjustable piston of an electromechanical brake booster situated upstream of the master brake cylinder or of a plunger device integrated in the brake system (such as specifically an IPB, Integrated Power Brake), or a pump rate of at least one pump used as the motorized brake pressure buildup device of the brake system can be ascertained as the input variable x. The examples of the input variable listed here can also be specified by an automatic system for controlling the autonomous braking processes of the vehicle. A motor torque of the motor of the motorized brake pressure buildup device, a transmission efficiency of a transmission of the brake system connected to the motorized brake pressure buildup device, at least one brake pressure in at least one wheel brake cylinder of the brake system, a braking force applied to the vehicle by the brake system, a braking torque applied to the vehicle by the brake system, or a vehicle deceleration applied to the vehicle by the brake system can also be ascertained as output variable p. All the variables listed here can be reliably determined without problems as input variable x or output variable p by a sensor system that is usually already installed on the vehicle. The method step S1 can thus be executed without an expansion of the sensor technology used on the vehicle.

The method step S1 can include a plurality of substeps S1a to S1c. For example, in a substep S1a, value groups can be ascertained during a plurality of driver-induced and/or autonomous braking processes of the vehicle, each of the ascertained value groups including in each case at least the ascertained input variable x, the output variable p ascertained simultaneously with the input variable x of the respective value group, and an item of friction value or location indication information relating to the roadway traveled by the vehicle simultaneously with the ascertaining of the input variable x and the output variable p. The friction value or location indication item of information can be the ascertained coefficient of friction u of the roadway traveled by the vehicle simultaneously with the ascertaining of the input variable x and the output variable p. Likewise, the friction value or location indication information can be a location indication of the roadway currently being traveled by the vehicle, ascertained simultaneously with the ascertaining of the input variable x and output variable p. Preferably, in this case, on the basis of the particular location information, the friction value u of the roadway traveled by the vehicle simultaneously with the ascertaining of the input variable x and the output variable p can be read out/queried from a specified friction value map. If, when executing method step S1a, it is not ensured that the value groups are ascertained during actively executed vehicle dynamics regulating processes, each of the value groups can additionally have an item of controller state information determined simultaneously with the ascertaining of the input variable x and output variable p with respect to a vehicle dynamics regulating process that may be executed simultaneously.

If, when executing substep S1a, it is not ensured that the value groups are ascertained during actively executed vehicle dynamics regulating processes, substep S1b is then executed. In substep S1b, the value groups having an item of controller state information deviating from an actively executed driving dynamic control are filtered out from the value groups ascertained through the execution of substep S1a. Substep S1b can be used to ensure that the value groups subsequently evaluated are ascertained during a plurality of vehicle dynamics regulating processes that are actively performed during driver-induced and/or autonomous braking processes.

As long as the value groups ascertained by executing substep S1a do not each contain a friction value u of the roadway traveled by the vehicle simultaneously with the ascertaining of the input variable x and output variable p, a further substep S1c can be executed. In substep S1c, the respectively assigned friction coefficient μ is determined for each of the value groups in that, on the basis of the respective location information, the respective friction value p is read/queried from the specified friction value map and is added to the respective value group. It is also possible for the respective friction value u to be inserted into the associated value group instead of the respective location indication/friction value or location information.

In an optional method step S2, after method step S1 (but before an execution of a method step S3), value groups are filtered out that are ascertained at a temperature outside a specified normal temperature range, at an adjustment speed of the brake pedal adjusted by the driver outside a specified normal speed range, at an on-board electrical system voltage outside a specified normal voltage range, during a failure of a data provision device, and/or during a fading. In this case, the method step S3 described below is carried out without using the value groups filtered out in the method step S2. (In these cases, the cause of deviations in the brake characteristic map is already clearly identified, namely undervoltage, fading, . . . ).

Figure 1C:
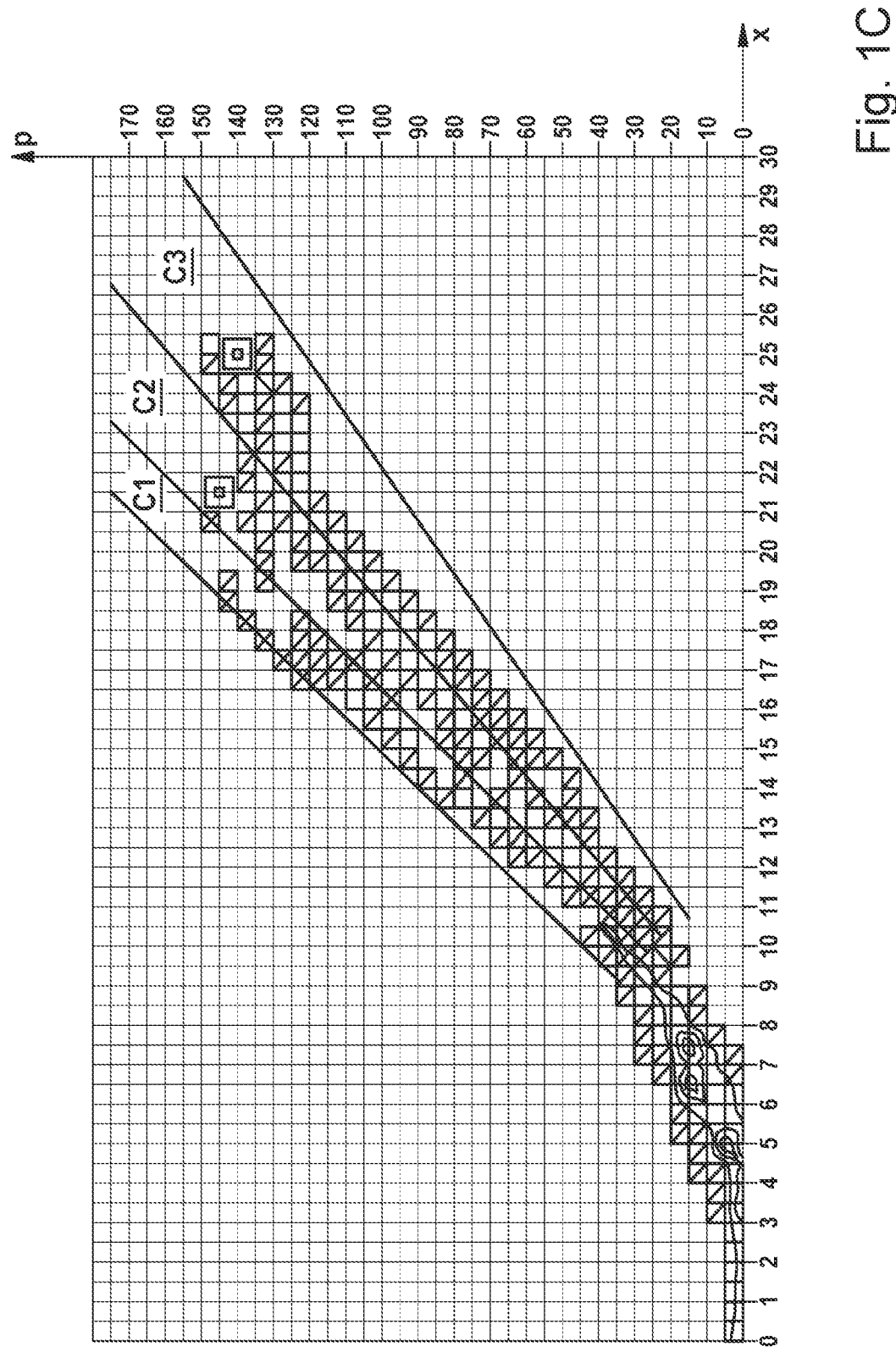
Figure 1D:
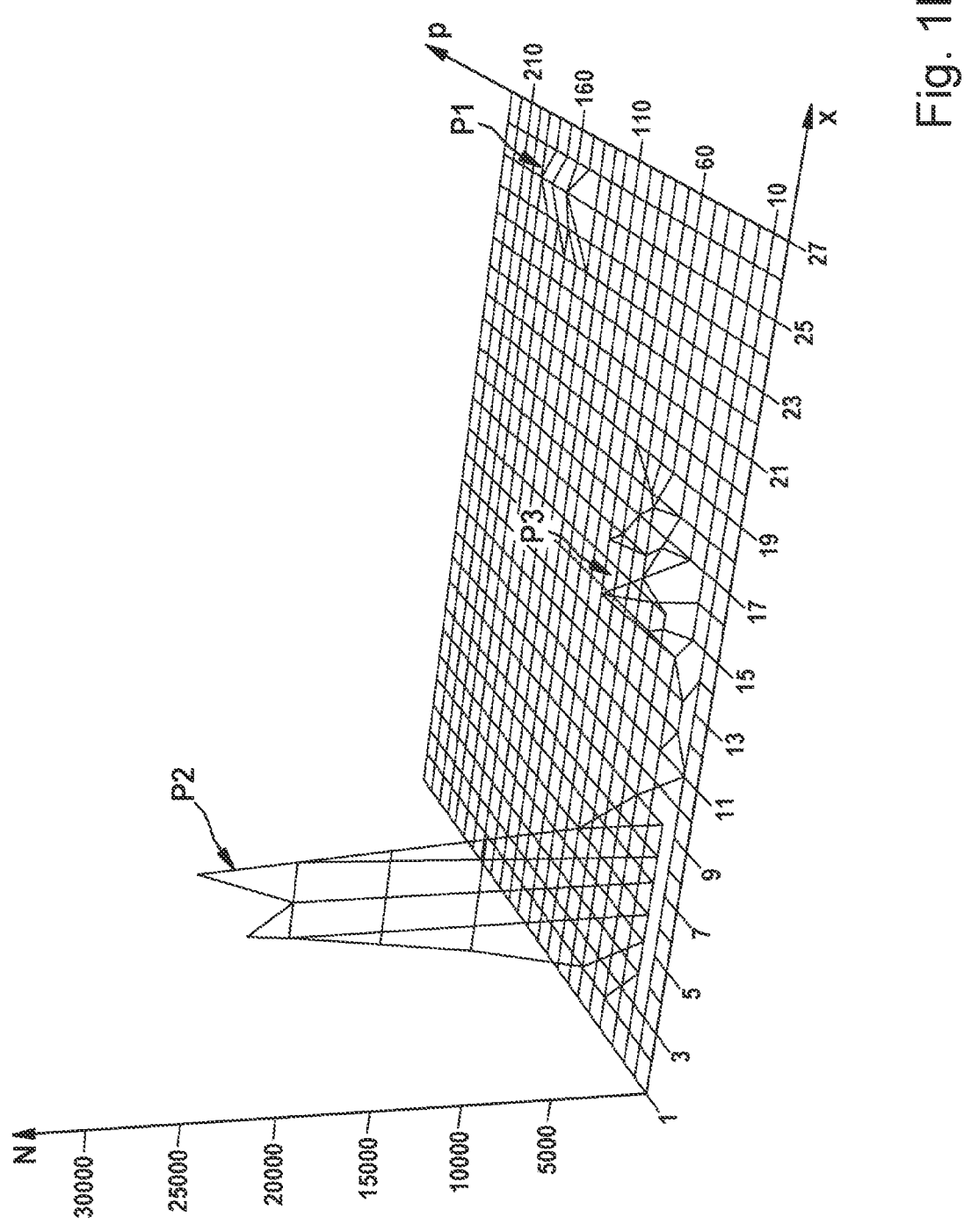

In method step S3, the ascertained (and not filtered out) value groups are entered into a coordinate system which has at least a first axis indicating the input variable x and a second axis indicating the output variable p, the friction value u being indicated by a third axis of the coordinate system or sectors in a plane spanned by the first axis and the second axis. FIGS. 1B through 1D show examples of the respective coordinate system, in which, as an example, the input variable x is the abscissa and the output variable p is the ordinate. It is to be noted, however, that the division of the first axis, the second axis and the (optional) third axis shown in the coordinate systems of FIGS. 1B through 1D is not to be interpreted as limiting. (For clarity, the third axis is not shown in the coordinate systems of FIGS. 1B through 1D.)

As can be seen in the coordinate systems of FIGS. 1B and 1C, a surface of the coordinate system spanned by the first axis and the second axis is divided into a plurality of target sectors C1 to C3, each of which corresponds to a specified target relation between the input variable x and the output variable p at a certain friction value $\mu_{C1}$ to $\mu_{C3}$. A first target sector C1 corresponds to the target relation at a first friction value $\mu_{C1}$, the first friction value $\mu_{C1}$ being smaller than a second friction value $\mu_{C2}$ of a second target sector C2. A third target sector C3 corresponds to the target relation at a third friction value $\mu_{C3}$ which is greater than the second friction value $\mu_{C2}$ of the second target sector C2. The target sectors C1 to C3 of the coordinate system can be realized having the same surface area and/or the same shape. Alternatively, the target sectors C1 to C3 can have different surface areas and/or different shapes. The respective shape and/or the respective surface content of the target sectors C1 to C3 can also be designed to be learnable.

As a supplement to the coordinate system, at least one further mathematical and/or physical variable and/or at least one item of environmental information can be pictorially represented by a further axis. As can be seen in the coordinate system of FIG. 1B, for example a frequency N of the value groups entered in a particular region of the area of the coordinate system spanned by the first axis and the second axis can be given by a further axis.

On the basis of the coordinate systems of FIGS. 1B and 1C, it can be seen whether the friction value μ ascertained in each case for an input variable x and its associated output variable p corresponds to the respective friction value $\mu_{C1}$ to pics of the specified target relation between the input variable x and the output variable p. For this purpose, it is necessary only to ascertain whether the friction values u of the value groups whose respective input variable x and the assigned output variable p fall/can be projected in a target sector C1 to C3 of the area of the coordinate system spanned by the first axis and the second axis correspond to the friction value $\mu_{C1}$ to $\mu_{C3}$ corresponding to the specified target relation. The coordinate systems of FIGS. 1B and 1C can thus be used to verify whether the respective output variable p of the value groups relates to the assigned input variable and the assigned friction value $\mu$ in accordance with the specified target relation.

In the coordinate system of FIG. 1B, for example, a marking P+ indicates that the marked value groups have friction values u which correspond to the second friction value $\mu_{C2}$ of the second target sector C2, in which the value groups marked with the mark P+ fall/can be projected. In contrast, by a marking N– in the coordinate system of FIG. 1B, it is also shown that some of the value groups have friction values u that are smaller than the third friction value $\mu_{C3}$ of the third target sector C3, in which the value groups marked with the mark N– fall/can be projected. The value groups indicated by the N– mark indicate, for example, the presence of air/residual air in the hydraulic system of the brake system.

In the coordinate system of FIG. 1C, it can be seen that value groups from the first target sector C1 with the first friction value μC1 "migrate into" the second target sector C2 with the second friction value $\mu_{C2}$. Correspondingly, value groups "migrate" from the second target sector C2 with the second friction value $\mu_{C2}$ into the third target sector C3 with the third friction value $\mu_{C3}$. This indicates a progressive leakage in the presence of residual air in the hydraulic system of the brake system concerned.

The prediction method described here is thus a very sensitive option for early detection of faults or functional impairments in the brake system. Advantageously, on the basis of the coordinate system created in each case it can be reliably predicted whether a component of the brake system that is still functional will at best have limited functionality in the near future. In particular, "incipient faults" in the brake system can be detected/predicted based on the coordinate system created in each case. The method steps S1 and S3 to be carried out for this purpose can be executed using comparatively inexpensive and relatively small-volume electronics.

In a further method step S4 of the prediction method described here, the friction values $\mu$ of the value group distributed to the various target sectors C1 to C3 are used to estimate whether an occurrence of at least one functional impairment of at least one brake system component of the brake system is probable at least during a specified prediction time interval. Method step S4 thus takes advantage of the fact that, on the basis of the coordinate systems, it is possible to recognize at an early stage whether the automatic system used to execute the vehicle dynamics regulating processes is no longer satisfied with the performance of the vehicle's brake system starting from a certain point in time, and has therefore initiated, through braking demands that are increased or weakened compared to the actual friction value $\mu$ of the roadway currently traveled on, deviations in the friction values $\mu$ entered in the coordinate system and the friction values $\mu_{C1}$ to $\mu_{C3}$ of the target sectors C1 to C3, in which the respective value groups fall/can be projected.

The prediction method described herein also makes use of the fact that the automatic system used to execute the vehicle dynamics regulating process, and not the driver of the vehicle, is responsible for the increased or decreased braking demand in response to the performance of the vehicle brake system. The driver's manner of driving is thus "filtered out" of the value groups entered in the coordinate system. Deviations in the friction values entered into the coordinate system u and the friction values $\mu_{C1}$ to $\mu_{C3}$ of the target sectors C1 to C3, in which the respective value groups fall/can be projected, are thus not attributable to the driving style of the driver, such as a comparatively slow and cautious driving style or a relatively fast and sporty driving style. Optionally, the driving style of the driver can additionally be acquired and evaluated using at least one derived variable, such as a pedal speed.

Using the above-described prediction method, it is also possible in particular to investigate an overall functionality of the electromechanical brake booster or the integrated plunger device with regard to predicting their future usability/functional capacity. In particular, this method can also be used to predict future failures of the electromechanical brake booster or the integrated plunger device that cannot be predicted by conventional monitoring methods and sensors according to the related art, such as by a motor position sensor or a differential sensor. The prediction method described here thus enables an advantageous early diagnosis, in particular for the electromechanical brake booster or the integrated plunger device of the vehicle brake system. However, it is expressly to be noted that the prediction method can also be used to investigate other brake system components with regard to an imminent functional impairment/a future failure.

In particular, if in method step S4 it is predicted that an occurrence of at least one functional impairment of at least one brake system component of the brake system is probable during the prediction time interval, then as optional method step S5 a corresponding warning can be communicated to the driver of the vehicle by an illuminated display, by a sound output, and/or by an image display. At least one light element of the vehicle, a sound output device of the vehicle, an image display device of the vehicle, and/or a mobile device of the driver, such as in particular his cell phone, can be used to communicate the warning. The driver can thus be prompted to look for a repair shop in a variety of ways. As an alternative or supplement, in method step S5 an item of service information corresponding to the prediction can also be sent to the workshop.

However, if it is predicted in method step S4 that there is no risk of an occurrence of at least one functional impairment in at least one brake system component of the brake system during the prediction time interval, then an enable criterion for autonomous driving of the vehicle can also be outputted as optional method step S6. Correspondingly, if it is predicted in method step S4 that an occurrence of at least one functional impairment of at least the one brake system component of the brake system is probable during the prediction time interval, the enable criterion for autonomous driving of the vehicle can be deactivated. Preferably, in this case the automatic system used for autonomous driving of the vehicle is designed in such a way that the automatic system is switched to an operating mode suitable for autonomous driving of the vehicle only if the enable criterion is present. This ensures that the vehicle is placed in autonomous driving mode only if a functional impairment of its brake system can be ruled out with a high degree of probability for at least the probable duration of autonomous driving.

As an optional further development of the prediction method described here, before method step S4 a method step S7 can also be inserted in which brake operating points P1 to P3 are assigned in each case to the value groups entered into the coordinate system (by executing method step S3). In the coordinate system of FIG. 1D, for example, three brake operating points P1 to P3 are shown, in which brake operating point P1 represents braking during an ABS controlling, brake operating point P2 represents a recuperation carried out at a relatively high vehicle speed, and brake operating point P3 represents a recuperation carried out at a comparatively lower speed. Subsequently, with additional taking into account of the distribution of the brake operating points P1 to P3 ascertained for the vehicle dynamics regulating process, it can be estimated even more reliably whether an occurrence of at least one functional impairment of at least the one brake component of the brake system is probable at least during the specified prediction time interval. It is expressly noted here that a brake operating point P1 to P3 can be assigned to each overall system state, in particular as a function of environmental data, road data, and/or traffic situation data. If the position of the respective brake operating point P1 to P3 in the coordinate system deviates from a target position specified for the particular braking operation, this indicates a decreasing functionality at least of the one brake component of the brake system. Transitions from a first brake operating point P1 to P3 to a second brake operating point P1 to P3, for example due to the driver braking during the transition from a dry road to snow, can also be detected and evaluated accordingly. The additional execution of method step S7 thus enables a transient and highly dynamic early diagnosis for the respective brake system.

Figure 2:
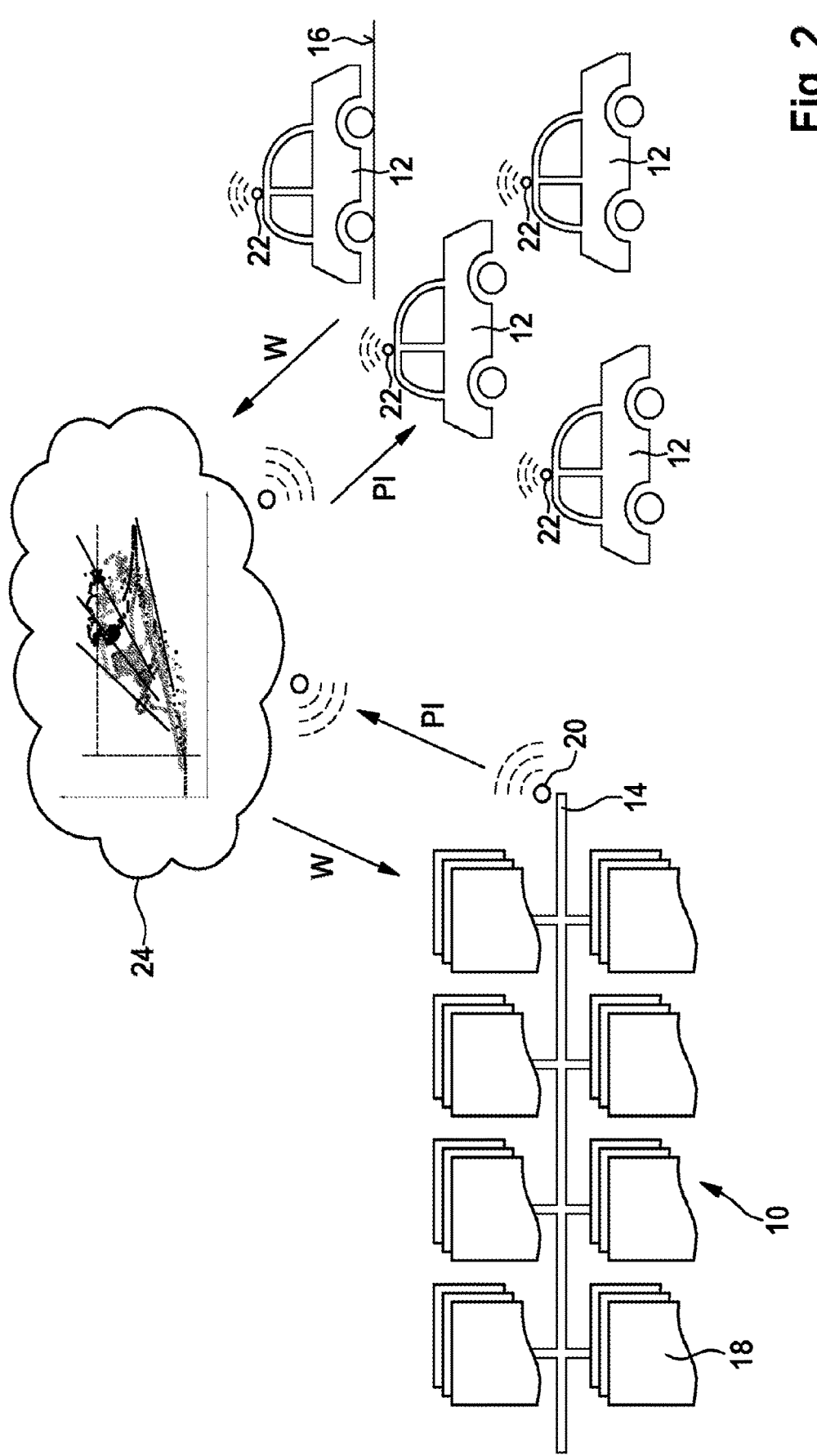
FIG. 2 shows a schematic illustration for explaining a mode of operation of an example embodiment of the prediction device for at least one brake system component of a brake system of a vehicle, according to the present invention.

FIG. 2 shows a schematic representation for explaining a manner of operation of an embodiment of the prediction device for at least one brake system component of a brake system of a vehicle.

The prediction device 10 described below can be used for prediction, in particular for early diagnosis, for at least one brake system component of a brake system of a vehicle 12. Usability of the prediction device 10 described in the following is limited neither to a particular brake system type of the respective brake system nor to a specific vehicle type/motor vehicle type of vehicle/motor vehicle 12 equipped with the respective brake system.

Prediction device 10 has an electronic device 14 designed and/or programmed to evaluate, in the manner described below, value groups W that are provided to electronic device 14 and each have values and/or information ascertained during a plurality of driving dynamics regulating processes actively executed during driver-induced and/or autonomous braking processes of vehicle 12. Driving dynamics controlling can be understood to mean, for example, an ABS controlling, an ESP controlling, a TCS controlling, or an ACC controlling.

The value groups W each include an ascertained input variable, a simultaneously ascertained output variable, and an item of friction value or location indication information relating to a roadway 16 simultaneously traveled on by vehicle 12. The input variable indicates an actuation strength of an actuation of a brake pedal by a driver of vehicle 12 or an operation mode of a motorized brake pressure buildup device of the brake system. Correspondingly, the output variable reflects a reaction of the brake system to the input variable. Examples of the input variable and the output variable have already been listed above. The friction value can for example be understood as a coefficient of friction of the roadway 16 traveled by vehicle 12.

Optionally, electronic device 14 can also be designed and/or programmed to filter out, from value groups W provided to the electronic device, which in each case include values and/or information ascertained during driver-induced and/or autonomous braking processes of the vehicle 12 and in each case include an item of controller state information in addition to the ascertained input variable, the simultaneously ascertained output variable, and the friction value or location indication information relating to the roadway 16 simultaneously traveled by the vehicle 12, the value groups having an item of controller state information that deviates from an actively executed vehicle dynamics regulating process. In this way, it can be ensured that the value groups W evaluated in the following by electronic device 14 are ascertained in each case during a driving dynamics regulating process actively executed during driver-induced and/or autonomous braking processes of the vehicle 12.

The electronic device 14 is also designed/programmed to read or ascertain, for value groups W provided to electronic device 14, the respective friction value of roadway 16 simultaneously traveled on by the vehicle 12, based on the respective friction value or location indication information. If the respective friction value or local indication information has not the respective friction value, but rather has a location indication of the roadway 16 simultaneously traveled on by the vehicle 12 as the friction value or location indication information, the electronic device 14 can for example be designed/programmed to query the respective friction value from a specified friction value map 18 on the basis of the respective location indication and to add the queried friction value to the respective value group W.

Moreover, electronic device 14 is designed/programmed to enter value groups W into a coordinate system having at least a first axis indicating the input variable and a second axis indicating the output variable, the friction value being indicated by a third axis of the coordinate system or sectors in a plane spanned by the first axis and the second axis. Examples of such a coordinate system are already described above. There it is also explained that a surface of the coordinate system spanned by the first axis and the second axis is divided into a plurality of target sectors, each of which corresponds to a specified target relation between the input variable and the output variable at a certain friction value.

Electronic device 14 can then to estimate, on the basis of the friction values of the value groups W distributed to the various target sectors, whether an occurrence of at least one functional impairment of at least one brake system component of the brake system is probable at least during a specified prediction time interval. Electronic device 14 then outputs a particular item of prediction information PI. Using the prediction information PI, for example a corresponding warning can be communicated to the driver of vehicle 12 by a light display, by a sound output, and/or by an image display. At least one light element of vehicle 12, a sound output device of vehicle 12, an image display device of vehicle 12, and/or a mobile device of the driver, such as in particular his cell phone, can be used to communicate the warning. Alternatively or additionally, an item of service information corresponding to the prediction information PI can also be sent to a repair shop. Likewise, the prediction information PI can also include an enabling criterion for autonomous driving of the vehicle. As an advantageous further development, electronic device 14 can further be designed and/or programmed to assign brake operating points to each of the value groups W entered in the coordinate system and to carry out the prediction/early diagnosis while additionally taking into account the distribution of the brake operating points ascertained for the driving dynamics regulating processes.

Prediction device 10 described here thus brings about the advantages of the prediction method already explained above. Prediction device 10 can be designed/programmed to carry out all the steps of the prediction method explained above.

Prediction device 10 can be understood as a prediction device 10 that is mountable/installable on vehicle 12. However, as shown graphically in FIG. 2, prediction device 10 can also include a communication device 20 designed to receive the value groups W transmitted by a data transmission device 22 of vehicle 12, in particular via the internet 24. Thus, prediction device 10 can still perform the advantageous prediction/early diagnosis even if there is a relatively large distance between it and vehicle 12. Thus, the interaction of prediction device 10 with vehicle 12 does not increase the weight of vehicle 12, nor is available installation space on vehicle 12 for prediction device 10 required. This also permits a comparatively large-volume and/or relatively heavy design of prediction device 10 without impairing the usability of prediction device 10. Moreover, the interaction of prediction device 10 with vehicle 12 in this case is also possible without an increase in the manufacturing costs of vehicle 12. As shown graphically in FIG. 2, prediction device 10 equipped with communication device 20 can also interact with a plurality of vehicles 12 to perform the prediction/early diagnosis. Since vehicles 12 are generally equipped with their own data transmission device 22, the prediction device 10 can thus be used in many ways.

What is claimed is:

1. A prediction device for at least one brake system component of a brake system of a vehicle, comprising:
an electronic device configured to:
for value groups provided to the electronic device, which each include values and/or information ascertained during a plurality of driving dynamics regulating processes actively executed during driver-induced and/or autonomous braking processes of the vehicle, and each include an ascertained input variable, a simultaneously ascertained output variable, and an item of friction value or location indication information relating to a roadway simultaneously traveled on by the vehicle, read or ascertain a respective friction value of the roadway simultaneously traveled on by the vehicle based on the respective friction value or location indication information, the input variable representing an actuation strength of an actuation of a brake pedal by a driver of the vehicle or an operating mode of a motorized brake pressure buildup device of the brake system, and the output variable representing a reaction of the brake system to the input variable;
enter the value groups into a coordinate system having at least a first axis indicating the input variables and a second axis indicating the output variables, the friction values being indicated by a third axis of the coordinate system or sectors in a plane spanned by the first axis and the second axis, the plane of the coordinate system spanned by the first axis and the second axis being subdivided into a plurality of target sectors, each of which corresponds to a specified target relation between the input variable and the output variable at a particular friction value; and
estimate, based on the friction values of the value groups distributed to the various target sectors, whether an occurrence of at least one functional impairment of at least one brake system component of the brake system is probable at least during a specified prediction time interval.

2. The prediction device as recited in claim 1, wherein the electronic device is configured to, for value groups provided to the electronic device, which each include, in addition to the ascertained input variable and the simultaneously ascertained output variable, a location indication of the roadway simultaneously traveled on by the vehicle as a friction value or location indication information, query the respective friction value from a specified friction value map based on the respective location indication and add the queried friction value to the value group.

3. The prediction device as recited in claim 1, wherein the electronic device is configured to filter out, from the value groups provided to the electronic device, which each include values and/or information ascertained during driver-induced and/or autonomous braking processes of the vehicle and which each include an item of controller state information in addition to the ascertained input variable, the simultaneously ascertained output variable, and the friction value or location indication information relating to the roadway simultaneously traveled by the vehicle, value groups having an item of controller state information that deviates from an actively executed vehicle dynamics regulating process.

4. The prediction device as recited in claim 1, wherein the electronic device is configured to assign brake operating points to each of the value groups entered into the coordinate system and to estimate, additionally taking into account a distribution of the brake operating points ascertained for the vehicle dynamics regulating processes, whether an occurrence of at least one functional impairment of at least the one brake system component of the brake system is probable at least during the specified prediction time interval.

5. The prediction device as recited in claim 1, wherein the prediction device is mountable on the vehicle.

6. The prediction device as recited in claim 1, wherein the prediction device has a communication device configured to receive the value groups transmitted by a data transmitting device of the vehicle.

7. A prediction method for at least one brake system component of a brake system of a vehicle, comprising the following steps:
ascertaining value groups during a plurality of driving dynamics regulating processes actively executed during driver-induced and/or autonomous braking processes of the vehicle, each of the ascertained value groups including an ascertained input variable, a simultaneously ascertained output variable, and an ascertained or queried friction value of a roadway simultaneously traveled on by the vehicle, the input variable representing an actuation strength of an actuation of a brake pedal by a driver of the vehicle or an operating mode of a motorized brake pressure buildup device of the brake system, and the output variable representing a reaction of the brake system to the input variable;
entering the ascertained value groups into a coordinate system having at least a first axis indicating the input variables and a second axis indicating the output variables, the friction values being indicated by a third axis of the coordinate system or sectors in a plane spanned by the first axis and the second axis, an area of the coordinate system spanned by the first axis and the second axis being subdivided into a plurality of target sectors, each of which corresponds to a specified target relation between the input variable and the output variable at a particular friction value; and
estimating, based on the friction values of the value groups distributed to the target sectors, whether an occurrence of at least one functional impairment of at least one brake system component of the brake system is probable at least during a specified prediction time interval.

8. The prediction method as recited in claim 7, where brake operating points are assigned to each of the value groups entered in the coordinate system and, additionally taking into account the distribution of the brake operating points ascertained for the vehicle dynamics regulating processes, it is estimated whether an occurrence of at least one functional impairment of at least the one brake system component of the brake system is probable at least during the specified prediction time interval.

9. The prediction method as recited in claim 7, wherein, before the ascertained value groups are entered into the coordinate system, the value groups are filtered out that are ascertained at a temperature outside a specified normal temperature range, and/or at an adjustment speed of the brake pedal adjusted by the driver outside a specified normal speed range, and/or at an on-board electrical system voltage outside a specified normal voltage range, and/or during a failure of a data provision device, and/or during a fading.

10. The prediction method as recited in claim 7, wherein:
the input variable is: a rod travel of an input rod connected to the brake pedal, or a master cylinder pressure in a master cylinder of the brake system, or a motor current strength of a motor of the motorized brake pressure buildup device, or an operating voltage of the motor of the motorized brake pressure buildup device, or an adjusting travel of at least one adjustable piston of the motorized brake pressure buildup device, or a pumping rate of at least one pump used as the motorized brake pressure buildup device of the brake system, and/or
the output quantity is: the master cylinder pressure in the master cylinder, or a motor torque of the motor of the motorized brake pressure buildup device, or a gear mechanism efficiency of a gear mechanism of the brake system connected to the motorized brake pressure buildup device, or at least one brake pressure in at least one wheel brake cylinder of the brake system, or a braking force applied to the vehicle by the brake system, or a braking torque applied to the vehicle by the brake system, or a vehicle deceleration applied to the vehicle by the brake system.

\* \* \* \* \*